(12) United States Patent
Thalhammer

(10) Patent No.: US 9,931,796 B2
(45) Date of Patent: Apr. 3, 2018

(54) INTERIOR PANELING PART COMPRISING A PLANAR HEATING ELEMENT AND METHOD FOR THE PRODUCTION THEREOF

(71) Applicant: Lisa Draexlmaier GmbH, Vilsbiburg (DE)

(72) Inventor: Hermann Thalhammer, Vilsbiburg (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 297 days.

(21) Appl. No.: 14/680,630

(22) Filed: Apr. 7, 2015

(65) Prior Publication Data

US 2015/0291001 A1 Oct. 15, 2015

(30) Foreign Application Priority Data

Apr. 9, 2014 (DE) .......................... 10 2014 005 190

(51) Int. Cl.
*B60L 1/02* (2006.01)
*H05B 3/34* (2006.01)
(Continued)

(52) U.S. Cl.
CPC ........ *B29C 70/682* (2013.01); *B29C 44/1214* (2013.01); *B29C 44/1271* (2013.01); *B29C 44/385* (2013.01); *B29L 2031/3041* (2013.01)

(58) Field of Classification Search
CPC ............ B60N 2/5685; H05B 2203/014; H05B 2203/029; H05B 3/34; B29C 44/02; B29C 44/022; B29C 44/025; B29C 44/12; B29C 44/1214; B29C 44/1223; B29C 44/1271; B29C 44/385; B29C 70/682; B29L 2031/3041
(Continued)

(56) References Cited

U.S. PATENT DOCUMENTS 4,869,550 A * 9/1989 Lorenzen ............ B29C 44/1276
297/180.12
6,770,854 B1 * 8/2004 Keane .................... H05B 3/342
219/212
(Continued)

FOREIGN PATENT DOCUMENTS

DE 37 03 939 A1 8/1988
DE 101 59 814 B4 6/2003
(Continued)

*Primary Examiner* — Sang Y Paik
(74) *Attorney, Agent, or Firm* — Finnegan, Henderson, Farabow, Garrett & Dunner LLP

(57) ABSTRACT

In accordance with the present disclosure, there is provided a method for producing an interior trim part. The method includes introducing a planar heating element into a cavity of a mold tool. The planar heating element has a first planar side facing away from a visible side of the interior trim part and a second planar side opposite to the first planar side, the mold tool has a plurality of protrusions protruding into the cavity, and the first planar side is seated on at least a portion of the plurality of protrusions. The method further includes adding a foam material into the cavity to cover the planar heating element, such that a foam layer is formed on both the first and second planar sides.

20 Claims, 4 Drawing Sheets

(51) Int. Cl.
  *B29C 70/68* (2006.01)
  *B29C 44/12* (2006.01)
  *B29C 44/38* (2006.01)
  *B29L 31/30* (2006.01)

(58) Field of Classification Search
  USPC .................................... 219/202, 492, 528
  See application file for complete search history.

(56) References Cited

U.S. PATENT DOCUMENTS

2001/0021438 A1\* 9/2001 Landvik .................... B32B 3/30
  428/179
2008/0238159 A1\* 10/2008 Parnis .................. B60N 2/5685
  297/180.12

FOREIGN PATENT DOCUMENTS

DE  10 2005 002 693 B3  9/2006
JP  H08-197547 A  8/1996

\* cited by examiner

INTERIOR PANELING PART COMPRISING A PLANAR HEATING ELEMENT AND METHOD FOR THE PRODUCTION THEREOF

CROSS-REFERENCE TO RELATED APPLICATION

This application is based upon and claims the benefit of prior German Application No. 10 2014 005 190.0, filed on Apr. 9, 2014, the entire contents of which are incorporated herein by reference.

FIELD OF THE INVENTION

The present disclosure relates to a method for producing interior trim parts, in particular for vehicles (such as motor vehicles, trains, airplanes, or boats), and to such an interior trim part. The disclosure relates in particular to interior trim parts comprising a planar heating element, which is embedded into a foam body of the interior trim part.

BACKGROUND OF THE DISCLOSURE

Interior trim parts that are used increasingly in vehicles are provided with planar heating elements. This applies not only to seat cushions, but to an increasing extent also to other trim parts, such as center arm rests or door or side trims. So as to preserve a pleasant feel of the interior trim parts and keep the heating element away from structural parts, such as of a seat or of a door, the heating element is often encased by a foamed material. Such a heating element is described in DE 101 59 814, for example.

So as to encase the heating element with foam, the heating element is usually encapsulated with the foam material in a foaming process using a corresponding mold tool. However, in this process, the positioning of the heating element in the cavity of the mold poses a problem. Nevertheless, positioning the heating element in the mold cavity is of high importance because this ultimately determines the position of the heating element in the finished foam body, and thus the position of the heating element in the interior trim part. Considering the geometry of many interior trim parts, which customarily are only a few millimeters to no more than a few centimeters thick, it becomes clear that positioning in the thickness direction is important. This thickness direction, which runs perpendicularly to the planar sides of the finished interior trim part, the heating element, and the foam body, is hereinafter also referred to as z-direction.

Inadequate positioning of the planar heating element in the z-direction can cause the same to be disposed undesirably close to one of the planar outer sides of the foam body or of the interior trim part. If said outer side is the visible side of the interior trim part, it is not only possible for the contour of the heating element to be apparent on the visible side and influence the feel, but also that the vehicle passenger can come more or less into direct contact with the heating element.

Insufficient embedding of the heating element in the foam body can also be disadvantageous on the other outer side, i.e., the outer side of the interior trim part located opposite the visible side. This is because the heating element, during installation of the interior trim part, can come in direct contact with carrier elements on which the interior trim part is to be mounted. This not only generates heat losses, but also increases the likelihood that the planar heating element or the carrier element is damaged during installation or during operation.

During production using a mold, the positioning in the z-direction poses a problem. While x- and y-directions, which correspond to the extensions in terms of length and width, can be controlled, for example by clamping the heating element into the mold, the heating element remains freely movable in the z-direction, at least to a certain degree.

Existing methods therefore provide for the compromise of inserting the heating element into the cavity of a corresponding mold in such a way that the same has contact with the wall of the mold cavity when a corresponding foam material is introduced into the mold cavity. This ensures at least the defined positioning of the heating element. After the foam material has been introduced, the component can be removed, with foam material being formed only on one of the planar sides of the heating element. To surround the heating element with foam material on the other planar side as well, cut foam is usually adhesively attached before the component can subsequently be laminated.

This has the disadvantage that the adhesive bonding of the cut foam constitutes an additional work step, which considerably increases the production time. In addition, this drastically limits the freedom of design of such an interior trim part comprising a planar heating element. For example, the cut foam is frequently cut from a block and therefore has undesirable corners. The contours of these corners are apparent on the finished laminated interior trim part as undefined edges.

For these reasons it is preferred to design the foam body of the interior trim part as an integral piece, i.e., together with the embedded heating element.

Various measures for positioning are proposed in this regard in the related art. DE 101 59 814, for example, proposes to use spacers made of foam material, which remain in the foam layer of the finished interior trim part. This has the disadvantage that additional work steps are necessary for placing the spacers. In addition, the spacers create the risk of the contours thereof being apparent on the surface of the finished interior trim part. Because these spacers as such are usually made of a foam material, they can deform when the foam material is added, which in turn results in imprecise positioning of the planar heating element.

SUMMARY

It is an object of the present disclosure to provide a method for producing an interior trim part including an inserted planar heating element, which allows easy and at the same time precise positioning of the planar heating element with respect to the dimensions of the interior trim part. Moreover, inhomogeneities in the composite are to be reduced or avoided. It is a further object of the present disclosure to provide a corresponding interior trim part, in which the planar heating element can be precisely positioned and which can be shaped easily and with high quality in complex geometries.

These objects are achieved by a method for producing an interior trim part including a planar heating element and an interior trim part as set forth in the claims.

The basic idea of the disclosure is to provide protrusions in the cavity of a mold and cover the planar heating element in foam or surrounding the same with a foam material. These protrusions protrude in the mold cavity and allow the back of the planar heating element to be placed thereon. The back in this context, unless otherwise specified, means the side of the heating element which faces away from the visible side of the finished interior trim part. By providing these protrusions, the planar heating element can be positioned in the z-direction, i.e., the thickness direction. In addition, the protrusions allow the planar heating element to be covered in or surrounded by foam so as to embed the same in foam layers of a foam body.

According to the disclosure, there is provided a method for producing an interior trim part having a visible side and a planar heating element that has mutually opposing planar sides. The method includes introducing the planar heating element into a cavity of a mold. One of the planar sides of the planar heating element, which face away from the visible side, is seated at least in sections on multiple raised protrusions of the mold which protrude into the mold cavity. The method further includes adding a foam material into the cavity of the mold. The planar heating element is covered in foam so that a foam layer is formed on the two planar sides of the planar heating element.

By placing the planar heating element on multiple raised protrusions, the planar heating element is positioned in the z-direction. At the same time, the free regions between the protrusions ensure that the foam material also penetrates into the region of the protrusions. This means that, after the foaming process, respective foam layers, which form a form body of the interior trim part, cover both of the two planar sides of the planar heating element.

The method according to the disclosure thus allows the planar heating element to be integrated in a defined manner into the layer composition of the interior trim part, and in particular in a defined manner in the z-direction. The layer composition of the interior trim part includes at least the two foam layers and the planar heating element. As a result of the composition it can be ensured that the contour of the heating element is not apparent on the visible side of the interior trim part. This ensures a uniform surface structure of the interior trim part. Moreover, the feel of the interior trim part, in particular the "soft-hard" sensation upon contact with the trim part, is not adversely affected by the heating element. In addition, the defined positioning in the z-direction by way of the raised protrusions ensures that, during installation of the interior trim part, the planar heating element does not come into contact with carrier elements, such as structural elements of a vehicle door or of a center console. Such contact not only can result in heat losses, but also can damage the carrier elements or the heating element. The production method according to the disclosure is furthermore economical, because no additional work steps are necessary for positioning the planar heating element. Because the outer structure, and in particular the visible side, of the interior trim part can be determined by the mold, prominent edges and radii can additionally be implemented.

The number and the design of the multiple raised protrusions may be selected in such a way that the planar heating element can be supported by the protrusions, without being excessively deformed in the region between the protrusions. At the same time, the protrusions may be dimensioned and disposed in such a way that they ensure the through-flow of the foam material for forming the two foam layers.

The term "covering in foam" in the present context means that the planar heating element is completely surrounded by a foam material, and the foam layers on the two planar sides of the planar heating element are integrally joined to each other to form a foam body.

The expression "planar sides" means in particular the sides of the respective components which have the largest surfaces. In general, these are, for example, the front or visible side of the interior trim part and the back thereof, the two opposing outer sides of the foam body, or the opposing main faces of the planar heating element.

The "visible side" means the side that is exposed in the finished interior trim part and, when installed, for example in the motor vehicle, is visually perceived at least in some regions.

As a further development of the method according to the disclosure, the interior trim part can be provided with an additional decorative layer. For this purpose, a corresponding decorative layer can be inserted into the mold cavity, and more particularly on a side of the mold cavity which is located opposite the raised protrusions of the mold cavity. In this way, an interior trim part in which the decorative element adjoins the foam layer can be generated when introducing the foam material and subsequently filling the mold cavity with foam.

In some embodiments, the planar heating element makes contact with the protrusions when the foam material is added. It can be ensured in this way that no shifting of the heating element occurs when the foam material is added. This ensures a particularly uniform product quality.

In some embodiments, the foam material is introduced into the mold cavity from a side that is located opposite the raised protrusions and forms the visible side of the interior trim part. If the foam material is introduced from this side of the heating element, the heating element is additionally pushed against the protrusions. As a result, the inflowing and expanding of the foam material presses the heating element against the protrusions in the mold cavity, and the positioning in the z-direction is further favored.

In some embodiments, the planar heating element has multiple through-passages for the foam material, which are evenly distributed over the planar heating element. This favors the penetration of the foam material throughout the entire mold cavity when the foam material is added into the mold cavity. This arrangement is particularly helpful when the foam material is added from only one of the planar sides of the planar heating element. In some embodiments, the through-holes in the planar heating element have a diameter of at least about 4 mm. In some embodiments, the diameter may be about 5 mm to about 7 mm. This ensures consistent penetration of the foam material throughout the entire mold cavity. Furthermore, through-holes having a diameter smaller than about 7 mm do not impair the placement of the planar heating element onto the protrusions of the mold.

In some embodiments, the multiple protrusions of the mold form a protuberance structure made of multiple evenly arranged protrusions at least in sections. "Evenly arranged at least in sections" means in particular that, in a section of the mold, the protrusions are arranged substantially in a regular pattern and at substantially even distances from each other. In some embodiments, the arrangement may be selected in such a way that, on the one hand, the planar heating element can be seated well on the protrusions and, on the other hand, the flow of foam is not impaired. Depending on the three-dimensional design of the finished interior trim part, the arrangement of the protrusions in the mold can also vary in different sections of the mold.

In some embodiments, the protrusions have the shape of a cone, a truncated cone, or a cylinder, and may have rounded edges. The protrusions may also have the shape of a hemisphere. These shapes may provide good support of the planar heating element, while on the other hand the round shape of the protrusions impairs the flow of the foam material in the mold cavity as little as possible. When protrusions, which are designed as a cone, a truncated cone, or a cylinder, are used, the rounded edges ensure that the planar heating element is not damaged and that the planar heating element is seated on the protrusions in a defined manner.

According to the disclosure, other shapes are also possible. In general, the shapes of the protrusions can be adapted in accordance with the requirements. For example, an elongated protrusion or multiple elongated protrusions, for example cuboid protrusions having rounded edges, can also be provided in sensitive regions to offer support. The design of the protrusions can therefore be matched to the carrier component of the vehicle to which the interior trim part is to be ultimately attached.

In some embodiments, the distance between centers of the raised protrusions is between about 5 mm and about 20 mm, with the protrusions at the base thereof having a diameter of about 4 mm to about 15 mm. The diameter of the protrusions may be smaller than the distance between the protrusions. The indicated dimensions may ensure a good compromise between penetration of the foam material throughout the mold cavity and support of the planar heating element when the same is seated on the protrusions.

In some embodiments, the protrusions may have a height of about 4 mm to about 15 mm. On the one hand, this ensures sufficient embedding of the planar heating element in the foam body of the finished interior trim part, and on the other hand this favors the feel of the finished product. In some embodiments, the protrusions may have varying heights within the mold. For example, protrusions having differing heights can be used to take a curved geometry of the carrier element into account. This ensures that it is also possible to suitably implement complicated shapes.

To simplify the positioning of the planar heating element in the x-y direction, i.e., in the plane perpendicular to the z-direction, the planar heating element may be positioned by means of locating pins and corresponding locating holes when the planar heating element is introduced into the mold cavity. The locating pins can be provided either in or outside the mold cavity. The locating pins engage in the locating holes in the planar heating element, to restrict a movement of the heating element in the x-y direction. The locating pins can either be introduced into the mold cavity as a separate part or be implemented as raised protrusions of the mold cavity. In some embodiments, the locating pins can be disposed on one or more raised protrusions.

In some embodiments, the locating pins can be disposed in the peripheral region of the mold. This makes it possible to easily remove said region in the finished product by cutting it to size. The locating holes can be formed in the planar heating element by way of stamping, for example. However, as an alternative, positioning in the x-y direction can also be carried out by simply clamping the planar heating element into the mold.

As a result of the above-mentioned positioning in the x-y direction in cooperation with the positioning in the z-direction by the raised protrusions, the position of the planar heating element in the finished interior trim part, or in the foam body thereof, can already be completely defined when covering it in foam. In this way an interior trim part having a consistently high quality is obtained, which additionally is easy to produce.

According to the disclosure, a corresponding interior trim part has the following features. The interior trim part, such as a trim part for vehicles, includes a foam body having mutually opposing, planar outer sides and a planar heating element having mutually opposing planar sides, which is embedded into the foam body so that the outer sides of the foam body in each case are located at a distance from the respective planar side of the planar heating element. One of the outer sides of the foam body, at least in sections, has multiple depressions that are open on the outer side. The interior trim part furthermore includes a decorative layer having a visible side and an opposing back. The visible side of the decorative layer closes the interior trim part toward the visible side. The back of the decorative layer faces the foam body and directly or indirectly adjoins the outer side of the same via a further layer. The depressions of the foam body are provided on the side of the foam body which faces away from the back of the decorative layer.

Including the decorative layer, the layer composition of the interior trim part may include the following layers from the visible side to the back: a decorative layer, a homogeneous foam layer, a planar heating element, and a foam layer having depressions. The homogeneous foam layer and the foam layer having depressions are integrally (in one piece or formed of the same material) joined to each other and form the foam body.

Such an interior trim part has the advantage that it can be created in one operation together with the applied decorative layer. This is achieved, for example, by introducing the decorative layer into the mold cavity on the side located opposite the protrusions and holding it, for example by way of a vacuum. All layers of the layer composition are disposed at defined distances and with defined thicknesses in the z-direction, i.e., in the direction perpendicular to the planar sides of the interior trim part, of the foam body, and of the planar heating element. However, it is also possible to apply the decorative layer subsequently to the foam body.

Embedding the planar heating element in the foam body ensures that the interior trim part is easily attached to the corresponding structural or carrier elements and, additionally, that a desired visual appearance and feel can be achieved on the visible side of the interior trim part.

The open depressions located on the outer side, i.e., the recesses that engage in the foam body from the corresponding outer side thereof, can be considered a mirror image of the raised protrusions in the mold.

In some embodiments, the planar heating element is at least partially exposed at a base of the depressions of the foam body. This partial exposure is the result of the planar heating element being seated on the protrusions of the mold when the foam material is added. This has the advantage that the relative position between the planar heating element and the mutually opposing, planar outer sides of the body can be set in a defined manner.

In some embodiments, the depressions are conical, truncated cone-shaped, or cylindrical depressions, and have rounded edges. The depressions may also be hemispherical depressions. Such depressions allow an even deformation of the foam body under pressure, which benefits both the feel and the visual appearance of the interior trim part. The depressions may have a diameter of about 4 mm to about 15 mm and a distance between centers of about 5 mm to about 20 mm. This also again favors the uniform appearance of the finished interior trim part. After the interior trim part has been applied to the corresponding structural or carrier element of a vehicle, the outer side of the interior trim part will therefore have no visible dimples or indentations.

However, other depressions are also conceivable, depending on the intended purpose. For example, an interior trim part that is to be attached to an edge of a carrier element, for example, can have an elongated depression, which encloses the edge when the part is installed. The depressions may be arranged at regular intervals at least in sections. The regular arrangement again means that, in sections of the interior trim part, the depressions are arranged in a substantially uniform pattern, in each case at substantially identical distances from each other.

This favors a uniform appearance as well as even haptic properties of the interior trim part.

In some embodiments, the planar heating element has multiple through-passages, which are distributed over the entire planar heating element and filled with the material of the foam body. On the one hand, this results from the above-mentioned production method, in which the through-passages ensure even penetration of the foam material throughout the mold cavity. On the other hand, the through-passages, which are filled with the material of the foam body, also cause good joining of the two foam layers on the two planar sides of the planar heating element and thereby contribute to the structural integrity of the foam body or of the finished interior trim part.

In some embodiments, the through-passages have a minimum diameter of about 4 mm. In some embodiments, the through-passages to have a diameter between about 5 mm and about 7 mm. In some embodiments, the depressions on one of the outer sides of the foam body have a depth of about 5 mm to about 15 mm. This represents the compromise between good embedding (insulation) of the planar heating element in the foam body and good haptic properties.

In some embodiments, the foam body is made of a polyurethane foam because these foams are pressure-resistant and nonetheless have a soft feel.

In some embodiments, the planar heating element includes a heating mat, a heating foil, or another metallized sheet material. In this way, embedding of the heating element into the foam body is simplified, without the foam body having to be unnecessarily thickened.

In some embodiments, the planar heating element can also be disposed only in a region of the interior trim part and other regions can be designed in a conventional manner, i.e., without heating elements. The local position of the heating element can be adapted to the respective requirements.

In the present disclosure, primarily planar heating elements were addressed with regard to the component to be embedded into a foam body or a corresponding interior trim part. However, the disclosure can also be readily applied to other planar materials. These can be, for example, mats made of reinforcing fibers to strengthen the foam body, insulating mats, or functional layers in general.

BRIEF DESCRIPTION OF THE DRAWINGS

The invention will be described hereafter by way of examples based on the accompanying drawings.

DETAILED DESCRIPTION

Figure 1A:
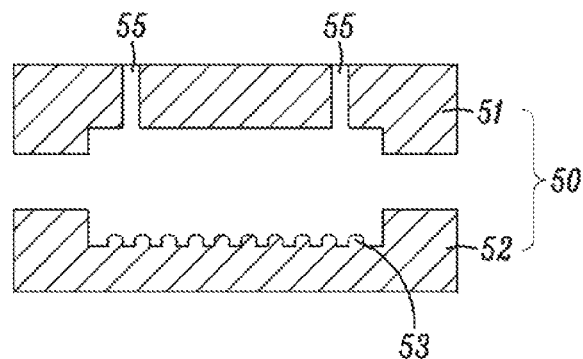
FIGS. 1A to 1D are sectional views of a mold tool used in an exemplary method according to the disclosure for producing an interior trim part according to the disclosure.

Unless indicated otherwise, identical or functionally equivalent components are denoted by the same reference numerals in the figures. Further modifications mentioned in this context can be combined with each other to form new embodiments.

FIGS. 1A to 1D show sectional views of a mold tool 50, which is used to implement the methods according to the present disclosure for producing an interior trim part 1. More specifically, FIGS. 1A to 1D each show a stage of the production method.

As is shown in FIG. 1A, a suitable mold tool 50 has two mold halves 51 and 52. Each of these can have a cutout, which together define a mold cavity 54. The mold tool 50 further has feeds 55 via which a foam material 31 can be introduced into the mold cavity 54. The division of the mold tool 50 into two mold halves 51 and 52 shall only be understood as an example here. The shown embodiment of the mold cavity 54 is also only provided to better illustrate the basic idea of the disclosure.

As shown in FIG. 1A, the mold tool 50 has protrusions 53 on at least one side of the mold cavity 54, which protrude into the mold cavity 54. The protrusions 53 are provided at least in some sections on the mold tool 50. In the figures, the protrusions 53 are provided over an entire side of the mold tool 50. However, the protrusions 53 can also be provided on multiple sides of a more complex mold design. In some embodiments, as shown in FIGS. 1A-1D, the sides in the mold cavity 54 opposite the protrusions 53 have a smooth surface, i.e., they are designed without protrusions.

Figure 1B:
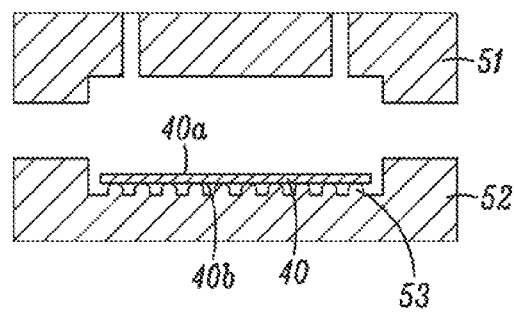

The protrusions 53 of the mold tool 50 are intended for a planar heating element 40 to be placed thereon. This is illustrated in FIG. 1B. In some embodiments, the protrusions 53 are dimensioned and designed for this purpose in such a way that the planar heating element 40 can be supported by the protrusions 53 without deformations of the planar heating element 40. By placing the planar heating element 40 on the raised protrusions 53 of the mold tool 50, the planar heating element 40 can be positioned with respect to a direction perpendicular to the planar sides of the heating element 40 (here, the z-direction).

To position the planar heating element 40 in the x- and y-directions on the raised protrusions 53, locating pins can be attached to the structure of the raised protrusions 53. The pins engage in corresponding locating holes of the planar heating element 40. Both elements, the locating pins and locating holes, are not shown in the drawings. The locating holes can be stamped into the planar heating element 40. In some embodiments, the locating pins are disposed in the peripheral region of the mold tool 50. In some embodiments, the locating pins are provided in a region of an overhang of the finished foam body, which is cut off during the further processing of the interior trim part, so that no cutouts, caused by the locating pins, are visible on the finished foam body.

Moreover, the sealing region of the mold tool 50 can be placed on the peripheral regions of the planar heating element 40, so that positioning in the x- and y-directions is also possible without locating pins and corresponding locating holes. A cable (not shown) for supplying the heating element 40 with power is provided on the planar heating element 40. One end of the cable is arranged at the positioned heating element 40 within the mold cavity 54, with another end being arranged outside the mold tool 50.

Figure 1C:
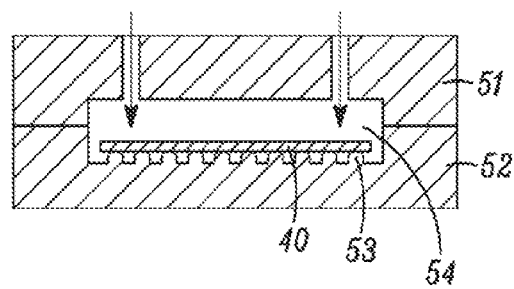
Figure 1D:
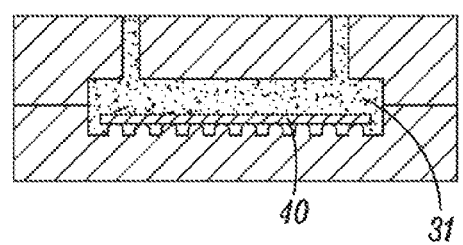

FIGS. 1C and 1D show the mold tool 50 in the closed state. In said state, foam material 31 can be added to the mold cavity 54 via the feeds 55. The hollow or intermediate spaces between the raised protrusions 53 ensure that the planar heating element 40 can be covered in foam in such a way that a foam layer is formed on both sides of the planar heating element 40.

In FIGS. 1A-1D, the feed openings 55 for the foam material 31 in the mold tool 50 are located opposite the raised protrusions 53. However, this shall only be understood as an example, and the arrangement of the feeds 55 can be varied appropriately for more complicated interior trim parts 1 and mold tools 50. With the arrangement shown in FIGS. 1A-1D, the foam material 31 flowing in through the feeds 55 pushes the planar heating element 40 against the raised protrusions 53, and it is therefore ensured that the planar heating element 40 does not lift off the raised protrusions 53 during the foaming process. This ensures a reliable positioning of the planar heating element 40 in the finished interior trim part 1 or foam body 10.

Figure 4:
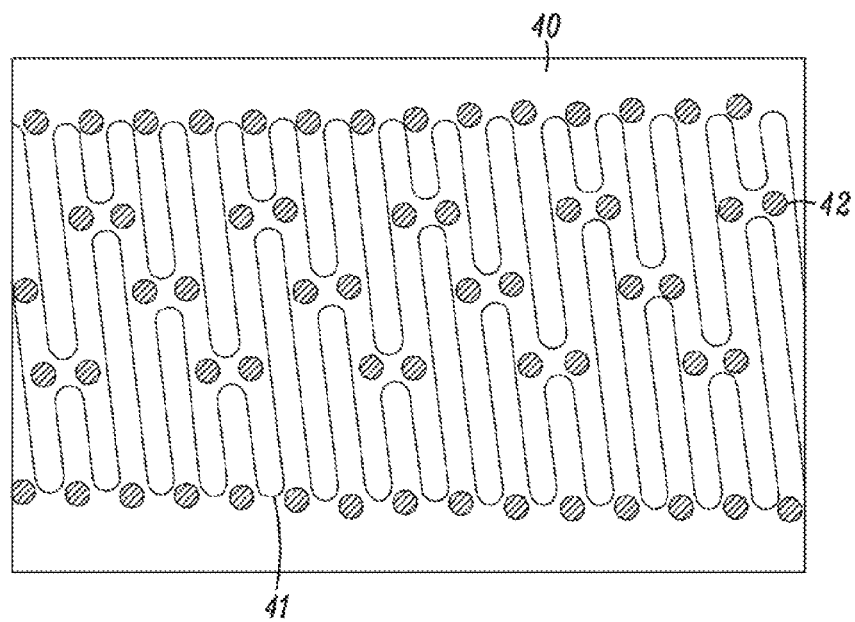
FIG. 4 is an illustration of a heating mat to be introduced into the interior trim part.

In some embodiments, a polyurethane foam is used as the foam material 31, which is pressure-resistant and nonetheless has a soft feel. The planar heating element 40 may be a heating mat, in which a heating strand 41 is knitted into a non-woven fabric, as shown in FIG. 4. As an alternative, it is also possible to use heating foils or other metallized sheet materials. In some embodiments, the planar heating element 40 is flexible, whereby the embedding of the heating element into the foam layer is simplified.

After an appropriate reaction time (approximately 120 seconds for a polyurethane (PU) foam), the foam body 10, together with the embedded planar heating element 40, can be removed. Thereafter, the foam body 10, including the planar heating element 40, can be suitably cut to size as needed. Finally, the foam body can be laminated.

By seating the planar heating element 40 on the raised protrusions 53 of the mold tool 50, it is ensured that the planar heating element 40 has appropriate distance on both planar sides or outer sides of the foam body 10.

Figure 2A:
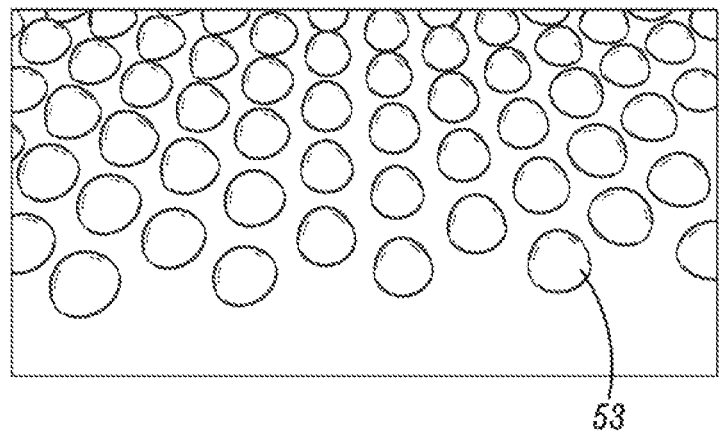
FIG. 2A shows a perspective view of raised protrusions of the mold.

An exemplary embodiment of the protrusions 53 of the mold tool 50 is shown in FIG. 2A. Here, the protrusions 53 are arranged in a regular protuberance structure. In the example shown in FIG. 2A, the protrusions 53 have approximately the shape of hemispheres, which protrude into the mold cavity 54. Alternatively, it has been found that cylinders, cones, or truncated cones, in each case with rounded edges, also represent a suitable structure for the raised protrusions 53.

Figure 2B:
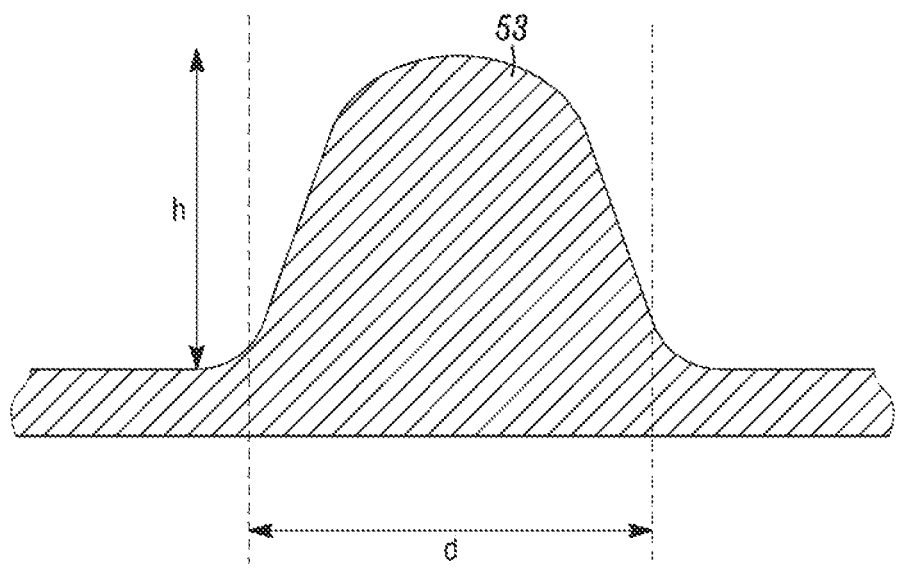
FIG. 2B shows a cross-sectional view of an exemplary protrusion of the mold.

Such a truncated cone having rounded edges is shown in FIG. 2B. It has a diameter d of approximately 6 mm, and the angle of inclination of the sides in this example is approximately 20 degrees. However, both parameters can be varied as needed. The height h can also be varied as needed. In general, it has been found that protrusions 53 having a blunt contact surface are suitable because the planar heating element 40 can be supported thereon well. In addition, the round base area of cylinders, cones, or truncated cones or hemispheres ensures that the foam material 31 can flow largely unimpaired between the protrusions 53.

The through-flow of the foam material in the structure of the protrusions 53 can moreover be influenced by appropriate arrangement of the protrusions 53. For example, by varying the distances of the protrusions 53 from each other, such as by using protrusions 53 having differing shapes, the flow of the foam material 31 can be influenced. The arrangement of the protrusions can additionally result from the component geometry of the finished interior trim part 1 or of the foam body 10. In regions of larger, planar surfaces, for example, an even distance between the protrusions 53 can be realized. In curvature regions, however, larger distances can be selected, or smaller diameters d at the same height h.

Figure 3:
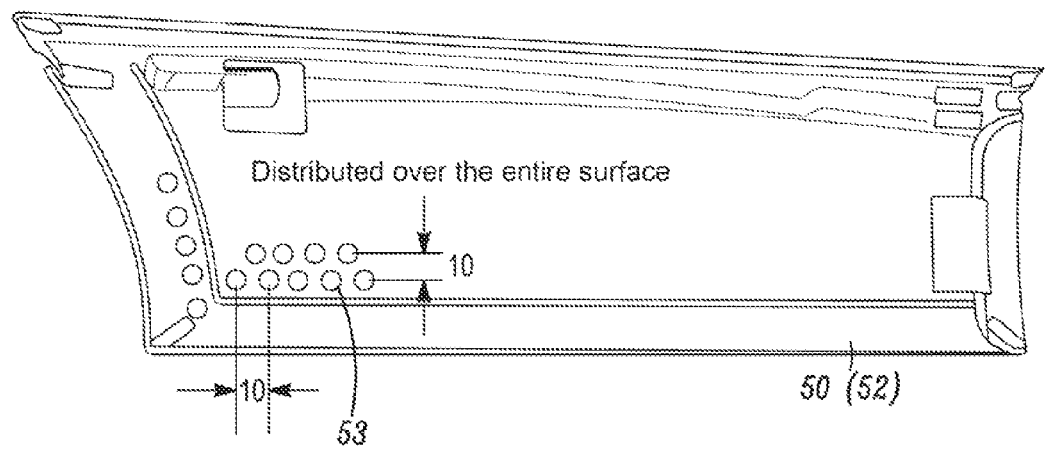
FIG. 3 shows a plan view of an inner side of a mold.

Such a need-specific embodiment of the protrusions 53 is shown in FIG. 3 by way of example, for a complicated mold tool part 52. Here, the protrusions 53 are divided into different, regular structures in some sections. "Regular structures" here means that, within a structure, in particular the distance between centers of the protrusions 53 is set to a uniform value. The distance between centers of neighboring protrusions 53 is 12 mm in the present example. In some embodiments, the diameters of the protrusions 53 are smaller than the distance between the protrusions 53. At these distances between centers, it can be ensured, for example, that a heating mat shown in FIG. 4 is not pushed into the spaces between the protrusions 53 as soon as the foam material 31 is introduced.

The height h of the protrusions 53 is about 10 mm and may be uniform among all the protrusions 53. In some embodiments, the height of the individual protrusions may vary, if, for example, the geometry of the finished foam body 10, or of the interior trim part 1, requires. For example, by appropriately selecting the height h of the protrusions 53, the distance between the planar sides of the foam body 10 and the planar heating element 40 can remain consistent. The total height of the foam body is about 25 mm. The foam layer, opposite the planar side of the planar heating element that is/was seated on the protrusions 53, has a height of about 10 mm.

In some embodiments, as shown in FIG. 3, the protrusions 53 are arranged, for example, in a regular hexagonal grid, or a regular arrangement in rows and columns. In some embodiments, the protrusions 53 may be arranged in a different manner, such as in a triangular grid or a quadratic grid, as needed when molding the foam body 10 and during the subsequent installation of the interior trim part 1.

FIG. 4 shows a planar heating element 10 by way of example as a heating mat. In addition to heating strands 41, which are knitted into a non-woven carrier fabric, the heating mat has through-passages 42. These are evenly distributed over the entire heating mat and formed by stamping, for example. The task of the through-passages 42 is to ensure the through-flow of foam material 31 when the foam material 31 is added into the mold cavity 54. This ensures an even and fast distribution of the foam material 31.

In some embodiments, a minimum diameter of the through-passages 42 is about 4 mm. In some embodiments, to ensure a consistent flow of foam material 31 throughout the heating mat, the diameter of through-passages 42 may be about 6 mm.

Figure 5:
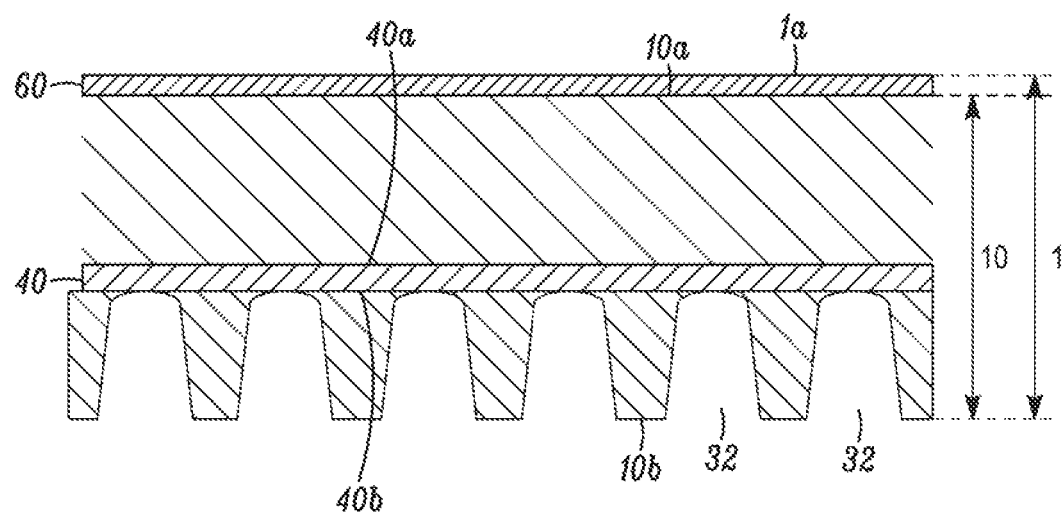
FIG. 5 shows a cross-section of an interior trim part including an inserted heating element.

FIG. 5 shows a sectional view of a finished interior trim part 1, which was formed using the mold tool 50 according to the present disclosure having the raised protrusions 53, which protrude into the mold cavity 54. The interior trim part 1 includes the planar heating element 40 and the foam body 10, into which the planar heating element 40 is embedded. As shown in FIG. 5, the outer sides of the foam body 10a and 10b in each case are located at a distance from the respective planar side 40a and 40b of the planar heating element 40. The foam body 10 has open depressions 32 on one of the outer sides.

Said open depressions 32 can be considered a mirror image of the raised protrusions 53 of the mold tool 50. In the present example, the depressions 32 have a height of about 10 mm and they have a truncated cone shape with rounded edges. The diameter of these open depressions 32 on the outer side is about 6 mm at a distance between centers of about 12 mm.

In some embodiments, as a result of the method for producing the interior trim part 1, according to which the planar heating element 40 is seated on the projections 53 when the foam material 31 is being introduced, the planar heating element 40 is exposed at the base of the depressions 32 in the finished foam body 10. That is, one planar side 40b of the planar heating element 40 at the base of the open depressions 32 is exposed.

As a result of the through-passages 42 in the planar heating element 40, the foam body 10, or the interior trim part 1, can further be characterized by corresponding openings (not shown), which are distributed in the finished foam body 10 over the entire planar heating element 40 and filled with the material of the foam body 10.

The interior trim part 1 is further provided with a decorative layer 60 that closes the interior trim part 1 toward the visible side 1a thereof. The decorative layer 60 adjoins the outer side 10a of the foam body 10, which is located opposite the outer side 10b of the foam body 10 on which the open depressions 32 are provided. In other words, the decorative layer 60 is seated on the planar side 10a of the foam body 10, which has no open depressions 32 and is smooth.

Possible materials for the decorative layer 60 include, for example, leather, including natural or synthetic leather, fabric films, or other planar materials. In some embodiments, the decorative layer 60 can be laminated onto the foam body 10 after the same has been formed. As an alternative, the decorative layer 60 can also be already inserted into the mold cavity 54 on a wall during the foaming process of the foam body 10.

The method according to the disclosure, the basic idea of which provides for a planar heating element to be introduced into a cavity of a mold tool in such a way that one of the planar sides of the planar heating element is seated at least in sections on multiple raised protrusions 53 of the mold tool 50, can be used to produce foam bodies 10, or interior trim parts 1 including an inserted planar heating element 40, which is positioned in the thickness direction or z-direction.

This ensures that the contour of the planar heating element is not apparent toward the visible side, and that a trim part having a smooth surface or a uniform smooth surface, is created. Moreover, the feel of the interior trim part, in particular the "soft-hard" sensation upon contact with the trim part, is not adversely affected by the planar heating element. This would be the case, for example, if the planar heating element were exposed on the visible side 10a of the foam body 10 due to mispositioning in the thickness direction. In addition, it can be ensured that the contour of the planar heating element 40 is also not apparent on the side 10b of the foam body 10 which is located opposite the visible side 10a. This not only reduces heat losses, but also lowers the likelihood of damaging the planar heating element 40 or the carrier element.

A further advantage is that a soft feel of the material can be realized by generating a defined foam layer on both sides, without the heating action of the planar heating element being impaired as a result of an excessively thick foam layer. It has furthermore been shown that the soft feel can even be increased further by the structure of the open depressions 32 in the foam body 10, or by the raised protrusions 53 of the mold tool, because the large clearances that are created by such a structure in the foam body 10 favor a soft feel.

The invention claimed is:

1. An interior trim part for an interior of a vehicle, comprising:
a foam body having a first outer side and a second outer side opposing to each other, at least a portion of the second outer side including a plurality of depressions;
a planar heating element embedded within the foam body and having a first planar side facing towards the first outer side of the foam body, and having an opposing second planar side facing towards the second outer side of the foam body, wherein:
the first outer side of the foam body is separated from the first planar side of the heating element;
the second outer side of the foam body is separated from the second planar side of the heating element; and
at least a portion of the planar heating element is exposed at a base of the depressions; and
a decorative layer disposed on the first outer side of the foam body, the decorative layer having a visible side and an opposing backside, the visible side being visible from the vehicle interior and facing away from the foam body, and the opposing backside facing the first outer side of the foam body.

2. The interior trim part according to claim 1, wherein the depressions have a shape corresponding to at least one of a cone, a truncated cone, a cylinder with rounded edges, or a hemisphere.

3. The interior trim part according to claim 1, wherein at least a portion of the second outer side includes the depressions arranged at regular intervals along the second outer side.

4. The interior trim part according to claim 3, wherein the planar heating element has a plurality of through-passages evenly distributed over the planar heating element and filled with a material of the foam body.

5. The interior trim part according to claim 4, wherein:
a distance between centers of neighboring depressions is between about 5 mm to about 20 mm; and
a diameter of the depressions at the second outer side of the foam body is between about 4 mm to about 15 mm.

6. The interior trim part according to claim 1, wherein the planar heating element has a plurality of through-passages distributed over the planar heating element and filled with a material of the foam body.

7. The interior trim part according to claim 6, wherein the planar heating element includes a plurality of heating strands.

8. The interior trim part according to claim 6, wherein the plurality of through-passages are evenly distributed over the planar heating element.

9. The interior trim part according to claim 1, wherein the depressions have a depth of about 4 mm to about 15 mm.

10. The interior trim part according to claim 1, wherein the planar heating element is formed of at least one of a heating mat, a heating foil, or a metallized sheet material.

11. The interior trim part according to claim 1, wherein:
a distance between centers of neighboring depressions is about 5 mm to about 20 mm; and
a diameter of the depressions at the second outer side of the foam body is about 4 mm to about 15 mm.

12. The interior trim part according to claim 1, wherein a plane extending through the base of the depressions defines a position of the planar heating element.

13. The interior trim part according to claim 1, wherein the depressions are configured to increase deformation of the foam body under pressure.

14. The interior trim part according to claim 1, wherein the depressions have varying depths.

15. The interior trim part according to claim 14, wherein the depressions have a shape corresponding to at least one of a cone, a truncated cone, a cylinder with rounded edges, or a hemisphere.

16. The interior trim part according to claim 14, wherein:
a distance between centers of neighboring depressions is about 5 mm to about 20 mm.

17. The interior trim part according to claim 14, wherein the planar heating element includes a plurality of heating strands.

18. The interior trim part according to claim 1, wherein at least a portion of the second outer side includes the depressions arranged in a grid pattern along the second outer side.

19. The interior trim part according to claim 18, wherein the grid pattern is at least one of hexagonal, triangular, or quadratic.

20. The interior trim part according to claim 18, wherein the depressions have a shape corresponding to at least one of a cone, a truncated cone, a cylinder with rounded edges, or a hemisphere.

\* \* \* \* \*